United States Patent
Bhardwaj et al.

(10) Patent No.: US 9,276,287 B2
(45) Date of Patent: Mar. 1, 2016

(54) NON-RECTANGULAR BATTERIES FOR PORTABLE ELECTRONIC DEVICES

(75) Inventors: Ramesh C. Bhardwaj, Fremont, CA (US); John Raff, Menlo Park, CA (US); Stephen R. McClure, San Francisco, CA (US); Erik L. Wang, Redwood City, CA (US); Taisup Hwang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1021 days.

(21) Appl. No.: 13/283,744

(22) Filed: Oct. 28, 2011

(65) Prior Publication Data

US 2013/0108906 A1    May 2, 2013

(51) Int. Cl.
| | |
|---|---|
| H01M 4/00 | (2006.01) |
| H01M 10/052 | (2010.01) |
| H01M 10/04 | (2006.01) |
| H01M 10/0565 | (2010.01) |
| H01M 10/0585 | (2010.01) |
| H01M 10/0587 | (2010.01) |

(52) U.S. Cl.
CPC ........ *H01M 10/052* (2013.01); *H01M 10/0431* (2013.01); *H01M 10/0436* (2013.01); *H01M 10/0459* (2013.01); *H01M 10/0565* (2013.01); *H01M 10/0585* (2013.01); *H01M 10/0587* (2013.01); *H01M 2220/30* (2013.01); *Y02E 60/122* (2013.01); *Y10T 29/4911* (2015.01); *Y10T 29/49108* (2015.01)

(58) Field of Classification Search
CPC ..................... H01M 10/0587; H01M 10/0585; H01M 10/0459; H01M 10/052; H01M 10/0565; H01M 10/0436; H01M 10/0431; H01M 2220/30; Y10T 29/4911; Y10T 29/49108; Y02E 60/122

USPC .......................... 429/94, 163; 29/623.1, 623.2
See application file for complete search history.

(56) References Cited

U.S. PATENT DOCUMENTS

| | | | |
|---|---|---|---|
| 6,224,995 B1 * | 5/2001 | Fauteux et al. | 429/48 |
| 2007/0105014 A1 * | 5/2007 | Shin et al. | 429/152 |
| 2009/0239133 A1 | 9/2009 | Kosugi | |
| 2011/0183183 A1 * | 7/2011 | Grady et al. | 429/152 |

FOREIGN PATENT DOCUMENTS

| | | | |
|---|---|---|---|
| EP | 2325929 A1 | | 5/2011 |
| JP | 1997-82361 A | † | 3/1997 |
| JP | 2001-028275 | | 1/2001 |
| WO | 2012009423 A1 | | 1/2012 |
| WO | 2012060972 A1 | | 5/2012 |

* cited by examiner
† cited by third party

*Primary Examiner* — Gary Harris
(74) *Attorney, Agent, or Firm* — Polsinelli PC

(57) ABSTRACT

The disclosed embodiments provide a battery cell. The battery cell includes a set of layers forming a non-rectangular shape, wherein the set of layers comprises a cathode with an active coating, a separator, and an anode with an active coating. The battery cell also includes a first conductive tab coupled to the cathode and a second conductive tab coupled to the anode. The layers are enclosed in a flexible pouch, and the first and second conductive tabs are extended through seals in the pouch to provide terminals for the battery cell. Furthermore, the non-rectangular shape is created by removing material from one or more of the layers.

18 Claims, 5 Drawing Sheets

NON-RECTANGULAR BATTERIES FOR PORTABLE ELECTRONIC DEVICES

BACKGROUND

1. Field

The present embodiments relate to batteries for portable electronic devices. More specifically, the present embodiments relate to battery cells with non-rectangular shapes to facilitate efficient use of space within portable electronic devices.

2. Related Art

Rechargeable batteries are presently used to provide power to a wide variety of portable electronic devices, including laptop computers, tablet computers, mobile phones, personal digital assistants (PDAs), digital music players and cordless power tools. The most commonly used type of rechargeable battery is a lithium battery, which can include a lithium-ion or a lithium-polymer battery.

Lithium-polymer batteries often include cells that are packaged in flexible pouches. Such pouches are typically lightweight and inexpensive to manufacture. Moreover, these pouches may be tailored to various cell dimensions, allowing lithium-polymer batteries to be used in space-constrained portable electronic devices such as mobile phones, laptop computers, and/or digital cameras. For example, a lithium-polymer battery cell may achieve a packaging efficiency of 90-95% by enclosing rolled electrodes and electrolyte in an aluminized laminated pouch. Multiple pouches may then be placed side-by-side within a portable electronic device and electrically coupled in series and/or in parallel to form a battery for the portable electronic device.

However, efficient use of space may be limited by the use and arrangement of cells in existing battery pack architectures. In particular, battery packs typically contain rectangular cells of the same capacity, size, and dimensions. The physical arrangement of the cells may additionally mirror the electrical configuration of the cells. For example, a six-cell battery pack may include six lithium-polymer cells of the same size and capacity configured in a two in series, three in parallel (2s3p) configuration. Within such a battery pack, two rows of three cells placed side-by-side may be stacked on top of each other; each row may be electrically coupled in a parallel configuration and the two rows electrically coupled in a series configuration. Consequently, the battery pack may require space in a portable electronic device that is at least the length of each cell, twice the thickness of each cell, and three times the width of each cell.

Moreover, this common type of battery pack design may be unable to utilize free space in the portable electronic device that is outside of a rectangular space reserved for the battery pack. For example, a rectangular battery pack of this type may be unable to efficiently utilize free space that is curved, rounded, and/or irregularly shaped.

Hence, the use of portable electronic devices may be facilitated by improvements related to the packaging efficiency, capacity, form factor, design, and/or manufacturing of battery packs containing lithium-polymer battery cells.

SUMMARY

The disclosed embodiments provide a battery cell. The battery cell includes a set of layers forming a non-rectangular shape, wherein the set of layers comprises a cathode with an active coating, a separator, and an anode with an active coating. The battery cell also includes a first conductive tab coupled to the cathode and a second conductive tab coupled to the anode. The layers are enclosed in a flexible pouch, and the first and second conductive tabs are extended through seals in the pouch to provide terminals for the battery cell. Furthermore, the non-rectangular shape is created by removing material from one or more of the layers.

In some embodiments, removing material from one or more of the layers involves removing the material from one or more sides of the cathode or the anode to form the non-rectangular shape. For example, material may be removed from a corner of the cathode and/or anode to form a rounded corner in the battery cell.

In some embodiments, the non-rectangular shape includes two or more thicknesses. For example, the two or more thicknesses may be created by removing material from the bottom and/or side of the cathode and/or anode to allow the battery cell to gradually decrease in thickness from one end to another.

In some embodiments, the set of layers is used to create at least one of a jelly roll and a bi-cell. For example, the layers may be wound on a mandrel to form a spirally wound jelly roll. Alternatively, the layers may be formed into bi-cells that are placed onto a large sheet of separator. The separator may then be folded repeatedly in one direction to stack the bi-cells and form the non-rectangular shape.

BRIEF DESCRIPTION OF THE FIGURES

In the figures, like reference numerals refer to the same figure elements.

DETAILED DESCRIPTION

Figure 1:
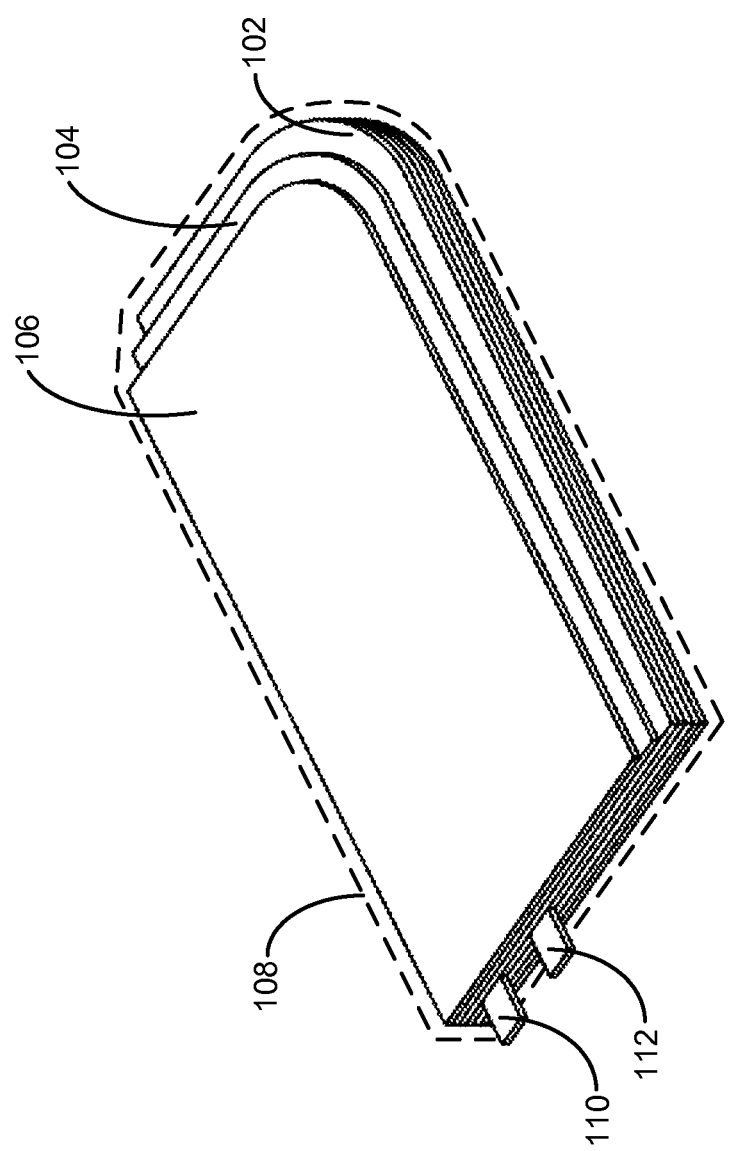
FIG. 1 shows a top-down view of a battery cell in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments relate to the design of a battery cell, which includes a set of layers enclosed in a pouch. The layers may include a cathode with an active coating, a separator, and an anode with an active coating.

The layers may be stacked and/or wound to create a jelly roll and/or bi-cell. The battery cell also includes a first conductive tab coupled to the cathode and a second conductive tab coupled to the anode. The first and second conductive tabs extend through seals in the pouch to provide terminals for the battery cell.

In addition, the battery cell may have a non-rectangular shape and/or design. The term "non-rectangular" can mean that the battery cell is not rectangular through any cutting plane, or in other words, that the battery cell is not rectangular when viewed from the top, bottom, and/or sides.

More specifically, the non-rectangular shape may be formed by removing material from one or more of the layers before winding and/or stacking the layers. For example, the material may be removed from one or more sides of the anode and/or cathode to form a rounded corner in the battery cell. The removed material may also form two or more thicknesses in the battery cell. The non-rectangular shape may further facilitate efficient use of space inside a portable electronic device by, for example, accommodating a scalloped shape of the portable electronic device.

FIG. 1 shows a battery cell in accordance with an embodiment.

The battery cell may correspond to a lithium-polymer cell that supplies power to a portable electronic device such as a laptop computer, mobile phone, tablet computer, personal digital assistant (PDA), portable media player, digital camera, and/or other type of battery-powered electronic device.

As shown in FIG. 1, the battery cell includes a number of layers 102-106 that form a non-rectangular, terraced structure with a rounded corner. Layers 102-106 may include a cathode with an active coating, a separator, and an anode with an active coating. For example, each set of layers 102-106 may include one strip of cathode material (e.g., aluminum foil coated with a lithium compound) and one strip of anode material (e.g., copper foil coated with carbon) separated by one strip of separator material (e.g., conducting polymer electrolyte).

To form the non-rectangular shape, material may be removed from layers 102-106. For example, material may be removed from the corners of the cathode and/or anode to form the rounded corner in the battery cell. Material may also be removed from layers 102-106 to create multiple thicknesses in the battery cell. For example, the curved, terraced shape associated with layers 102-106 may be formed by removing material from the upper right corners of layers 102, removing material from the tops and right sides of layers 104, and removing more material from the tops and right sides of layers 106. In other words, material may be removed from layers 102-106 so that layers 102-106 have the same shape but the bottommost layers 102 are the largest, the middle layers 104 are smaller, and the topmost layers 106 are the smallest.

Layers 102-106 may then be arranged to form the non-rectangular shape. For example, layers 102-106 may be wound on a mandrel to form a spirally wound structure such as a jelly roll. Alternatively, layers 102-106 may be formed into bi-cells that are placed onto a large sheet of separator. The separator may then be folded repeatedly in one direction to stack the bi-cells and form the non-rectangular shape. In other words, the non-rectangular shape of the battery cell may be affected by both the removal of material from layers 102-106 and the subsequent winding and/or stacking of layers 102-106, as discussed in further detail below with respect to FIG. 3.

After layers 102-106 are formed into the non-rectangular shape, layers 102-106 may be enclosed in a pouch 108, and a set of conductive tabs 110-112 may be extended through seals in the pouch (for example, formed using sealing tape) to provide terminals for the battery cell. Conductive tabs 110-112 may be used to electrically couple the battery cell with one or more other battery cells to form a battery pack. For example, conductive tab 110 may be coupled to the cathode (s) of layers 102-106, and conductive tab 112 may be coupled to the anode(s) of layers 102-106. Conductive tabs 110-112 may further be coupled to other battery cells in a series, parallel, or series-and-parallel configuration to form the battery pack. The coupled cells may be enclosed in a hard case to complete the battery pack, or the coupled cells may be embedded within the enclosure of the portable electronic device.

To enclose the battery cell in pouch 108, layers 102-106 may be placed on top of a flexible sheet made of aluminum with a polymer film, such as polypropylene. Another flexible sheet may then be placed over the tops of layers 102-106, and the two sheets may be heat-sealed and/or folded. Alternatively, layers 102-106 may be placed in between two sheets of pouch material that are sealed and/or folded on some (e.g., non-terminal) sides. The remaining sides(s) may then be heat-sealed and/or folded to enclose layers 102-106 within pouch 108.

In one or more embodiments, the battery cell of FIG. 1 facilitates efficient use of space within the portable electronic device. For example, the terraced and/or rounded edges of the battery cell may allow the battery cell to fit within a curved enclosure for the portable electronic device. The number of layers (e.g., layers 102-106) may also be increased or decreased to better fit the curvature of the portable electronic device's enclosure. In other words, the battery cell may include an asymmetric and/or non-rectangular design that accommodates the shape of the portable electronic device. In turn, the battery cell may provide greater capacity, packaging efficiency, and/or voltage than rectangular battery cells in the same portable electronic device.

Figure 2:
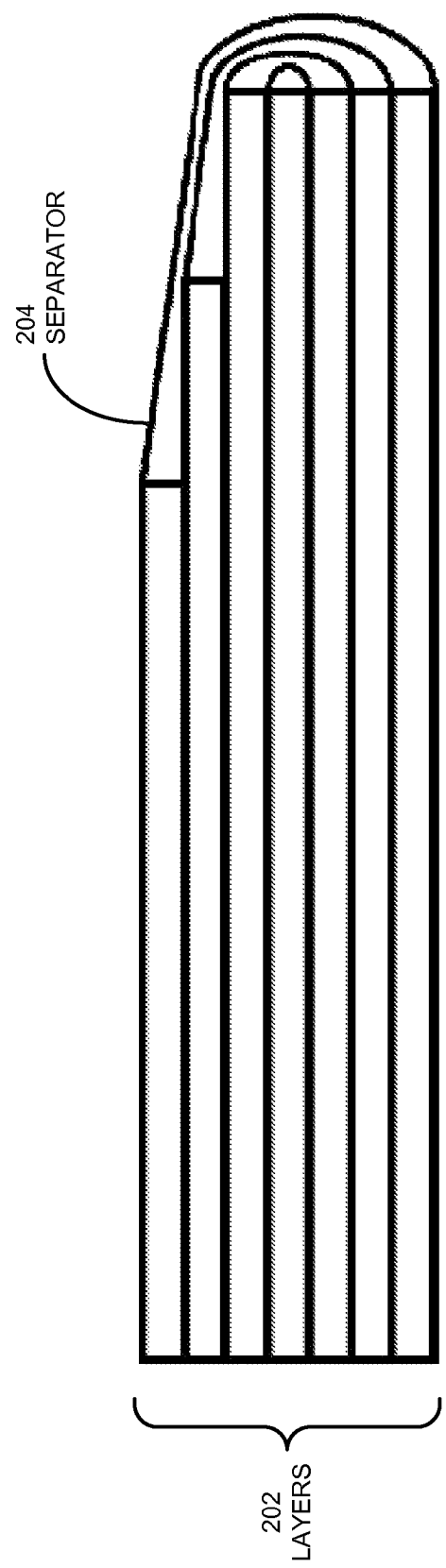
FIG. 2 shows a cross-sectional view of a battery cell in accordance with the disclosed embodiments.

FIG. 2 shows a cross-sectional view of a battery cell in accordance with the disclosed embodiments. More specifically, FIG. 2 shows a cross-sectional view of the battery cell of FIG. 1. As shown in FIG. 2, a set of layers 202 is arranged to create three different thicknesses in the battery cell, with the thicknesses decreasing from left to right. The variation in thickness may allow the battery cell to fill up the free space within a portable electronic device. For example, the battery cell may be designed to take up a curved and/or sloping region of space inside a mobile phone, laptop computer, tablet computer, portable media player, digital camera, and/or PDA.

The battery cell may be formed by stacking and/or winding layers 202 (e.g., cathode, anode, separator) to create a jelly roll and/or bi-cell and enclosing layers 202 in a pouch. In addition, the multiple thicknesses may be created by removing material from one or more layers 202 before winding and/or stacking layers 202. For example, bi-cells of different sizes may be created by stacking sheets of cathode, anode, and separator and cutting the bi-cells out of the sheets. The bi-cells may then be placed side-by-side onto a large sheet of separator 204 that is folded repeatedly in one direction to stack the bi-cells on top of one another and form the battery cell, as discussed below with respect to FIG. 3.

Figure 3:
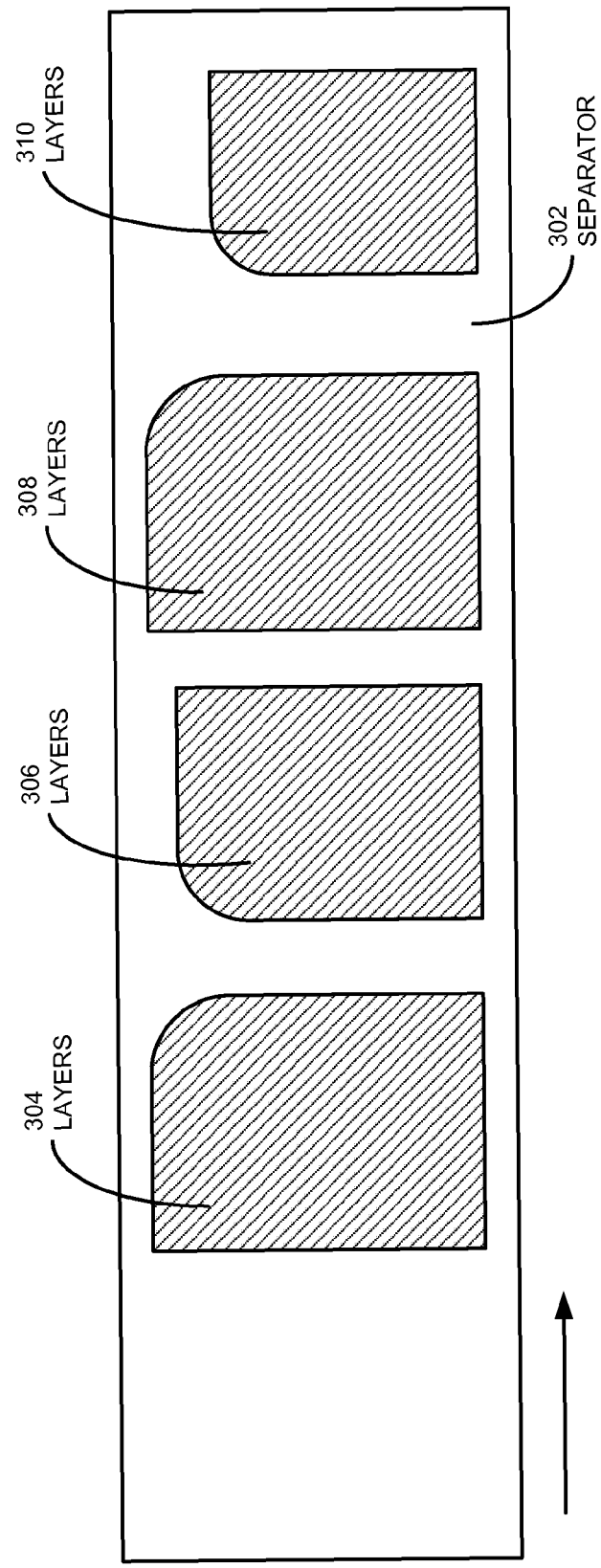
FIG. 3 shows the arrangement of a set of layers for a battery cell in accordance with the disclosed embodiments.

FIG. 3 shows the arrangement of a set of layers 304-310 for a battery cell in accordance with the disclosed embodiments. More specifically, layers 304-310 may be used to create the battery cell of FIG. 1. Layers 304-310 may correspond to bi-cells of different sizes that are used to form a non-rectangular shape in the battery cell. To create each bi-cell, a sheet of separator may be placed in between a sheet of cathode material and a sheet of anode material. The outline of the bi-cell (e.g., rectangular with a rounded corner) may then be cut into the sheets to remove material outside the outline from the bi-cell. Layers 304-310 may then be placed onto a large strip of separator 302, and the battery cell may be created by repeatedly folding separator 302 from left to right to form a non-rectangular stack of layers 304-310.

First, the left side of separator 302 may be folded on top of layers 304 to cover both sides of layers 304 with separator 302. Next, separator 302 and layers 304 may be folded over layers 306 so that layers 304-306 are stacked but also separated by a layer of separator 302. Layers 304-306 and separator 302 may then be folded over layers 308 so that layers 308 are added to the stack but separated from adjacent layers 304 in the stack by separator 302. Finally, layers 304-308 and separator 302 may be folded over layers 310 so that layers 310 are added to the stack but separated from adjacent layers 306 in the stack by separator 302.

Layers 304-310 may also be arranged on separator 302 to form the non-rectangular, terraced shape of the battery cell. As shown in FIG. 3, layers 304-310 may be cut and/or oriented so that the rounded corners of layers 304-310 alternate between the left and right sides of adjacent layers 304-310 on separator 302. For example, the upper right corners of layers 304 and 308 are rounded, while the upper left corners of layers 306 and 310 are rounded. Such alternation may ensure that the rounded corners of layers 304 form a single rounded corner in the battery cell after layers 304-310 are stacked using the left-to-right folding process described above.

Similarly, the left-to-right ordering of layers 304-310 on separator 302 may allow the terraced shape of FIG. 1 to be formed after layers 304-310 are stacked. More specifically, the stacking of layers 304-306 may form a stack with large layers 304 on one end of the stack and medium-sized layers 306 on the other end of the stack. The folding of layers 304-306 over layers 308 may place layers 308 next to layers 304, thus increasing the thickness of the large layers in the stack. Finally, the folding of layers 304-308 over layers 310 may place layers 310 next to layers 306, thus forming a stack with the largest layers 304 and 308 on one end of the stack, the second largest layers 306 in the middle of the stack, and the smallest layers 310 on the other end of the stack.

Figure 4:
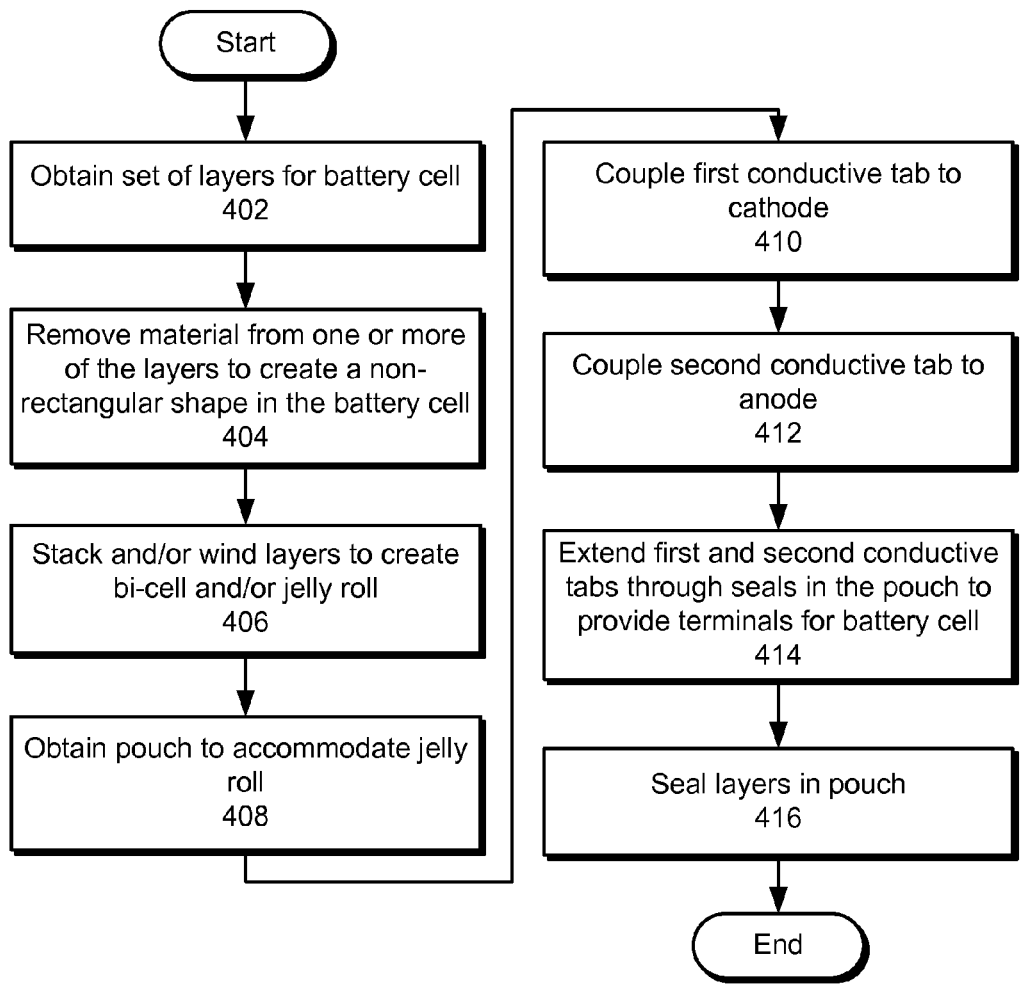
FIG. 4 shows a flowchart illustrating the process of manufacturing a battery cell in accordance with the disclosed embodiments.

FIG. 4 shows a flowchart illustrating the process of manufacturing a battery cell in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of layers for a battery cell is obtained (operation 402). The layers may include a cathode with an active coating, a separator, and an anode with an active coating. Next, material is removed from one or more of the layers to create a non-rectangular shape in the battery cell (operation 404). For example, the material may be removed to create a rounded corner and/or multiple thicknesses in the battery cell.

The layers are stacked and/or wound to create a bi-cell and/or jelly roll (operation 406). For example, the layers may be wound onto a flat mandrel to create a jelly roll with a flattened shape. On the other hand, the layers may be cut into bi-cells that are stacked by placing the bi-cells onto a long strip of separator and repeatedly folding the separator in one direction.

To assemble the battery cell, a pouch to accommodate the jelly roll is obtained (operation 408). Next, a first conductive tab is coupled to the cathode of the jelly roll (operation 410), and a second conductive tab is coupled to the anode of the jelly roll (operation 412). The first and second conductive tabs are extended through seals in the pouch to provide terminals for the battery cell (operation 414). Finally, the jelly roll is sealed in the pouch (operation 416). For example, the jelly roll may be sealed by spot welding, taping, and/or applying heat to the seals.

Figure 5:
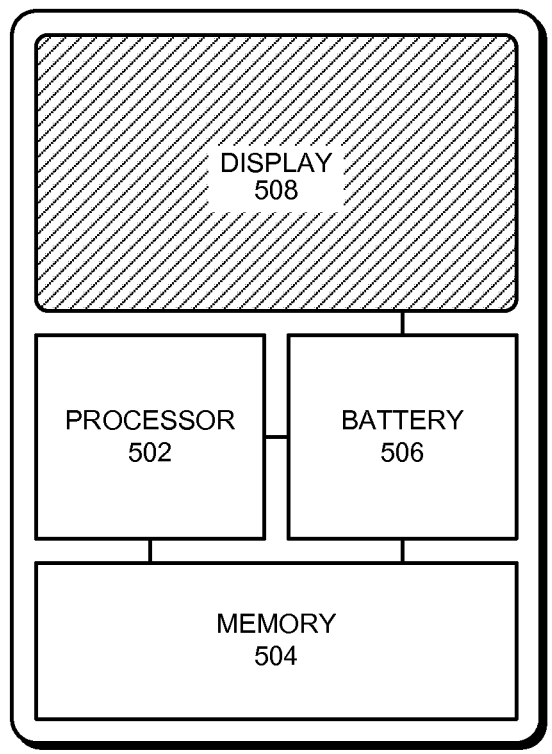
FIG. 5 shows a portable electronic device in accordance with the disclosed embodiments.

The above-described rechargeable battery cell can generally be used in any type of electronic device. For example, FIG. 5 illustrates a portable electronic device 500 which includes a processor 502, a memory 504 and a display 508, which are all powered by a battery 506. Portable electronic device 500 may correspond to a laptop computer, mobile phone, PDA, portable media player, digital camera, and/or other type of battery-powered electronic device. Battery 506 may correspond to a battery pack that includes one or more battery cells. Each battery cell may include a set of layers forming a non-rectangular shape. The layers may include a cathode with an active coating, a separator, and an anode with an active coating. The non-rectangular shape may be created by removing material from one or more of the layers. For example, a terraced shape with a rounded corner may be created by removing material from one or more sides of the cathode and/or anode. The non-rectangular shape may allow battery 506 to fit along the perimeter of a mobile phone, tablet computer, and/or laptop computer with a scalloped shape.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A battery cell, comprising: a stack of non-rectangular layers that vary in size, comprising electrode layers with intervening separator layers, wherein the electrode layers include alternating anode and cathode layers, and wherein the layers that vary in size are aligned to be flush with each other on at least one flush-side of the stack; wherein each of the electrode layers in the stack has the same non-rectangular shape; and wherein one or more consecutive electrode layers in the stack vary in size; and wherein the electrode layers in the stack form a non-rectangular terraced shape.

2. The battery cell of claim 1, wherein the flush-side of the stack includes conductive tabs that extend from the electrode layers in the stack.

3. The battery cell of claim 1, wherein the battery cell further comprises:
- a flexible pouch enclosing the stack of non-rectangular layers;
- a first conductive tab coupled to the cathode layers in the stack;
- a second conductive tab coupled to the anode layers in the stack; and
- wherein the first and second conductive tabs extend through seals in the flexible pouch to provide terminals for the battery cell.

4. The battery cell of claim 1,
- wherein the cathode layers comprise aluminum foil coated with a lithium compound; wherein the anode layers comprise copper foil coated with carbon; and
- wherein separator layers comprise a conducting polymer electrolyte.

5. The battery cell of claim 1, wherein the layers vary in size so that the battery cell fills a curved or sloping region of space.

6. A method for manufacturing a battery cell, comprising:
- forming a set of non-rectangular layers into a stack, comprising electrode layers with intervening separator layers, wherein the electrode layers include alternating anode and cathode layers, and wherein the layers that vary in size are aligned to be flush with each other on at least one flush-side of the stack;
- wherein each of the electrode layers in the stack has the same non-rectangular shape; and
- wherein one or more consecutive electrode layers in the stack vary in size.

7. The method of claim 6, wherein forming the set of non-rectangular layers into the stack includes performing stacking operations on the layers to form the stack.

8. The method of claim 6, wherein forming the set of non-rectangular layers into the stack includes perform a winding operation to form a jelly roll, wherein the jelly roll includes the stack.

9. The method of claim 6, wherein the flush-side of the stack includes conductive tabs that extend from the electrode layers in the stack.

10. The method of claim 6, further comprising:
- coupling a first conductive tab to the cathode layers in the stack;
- coupling a second conductive tab to the anode layers in the stack;
- enclosing the stack in a flexible pouch; and
- extending the first and second conductive tabs through seals in the flexible pouch to provide terminals for the battery cell.

11. The method of claim 6,
- wherein the cathode layers comprise aluminum foil coated with a lithium compound;
- wherein the anode layers comprise copper foil coated with carbon; and
- wherein separator layers comprise a conducting polymer electrolyte.

12. The method of claim 6, wherein the layers vary in size so that the battery cell fills a curved or sloping region of space.

13. A battery pack, comprising:
- a set of battery cells, wherein each of the battery cells comprises:
  - a stack of non-rectangular layers that vary in size, comprising electrode layers with intervening separator layers, wherein the electrode layers include alternating anode and cathode layers, and wherein the layers that vary in size are aligned to be flush with each other on at least one flush-side of the stack;
  - wherein each of the electrode layers in the stack has the same non-rectangular shape; and
  - wherein one or more consecutive electrode layers in the stack vary in size.

14. The battery pack of claim 13, wherein the flush-side of the stack includes conductive tabs that extend from the electrode layers in the stack.

15. The battery pack of claim 13, wherein each battery cell in the set of battery cells further comprises:
- a flexible pouch enclosing the stack of non-rectangular layers;
- a first conductive tab coupled to the cathode layers in the stack;
- a second conductive tab coupled to the anode layers in the stack; and
- wherein the first and second conductive tabs extend through seals in the flexible pouch to provide terminals for the battery cell.

16. A portable electronic device, comprising: a set of components powered by a battery pack; and the battery pack comprising: a set of battery cells, wherein each of the battery cells comprises: a stack of non-rectangular layers that vary in size, comprising electrode layers with intervening separator layers, wherein the electrode layers include alternating anode and cathode layers, and wherein the layers that vary in size are aligned to be flush with each other on at least one flush-side of the stack; wherein each of the electrode layers in the stack has the same non-rectangular shape; and wherein one or more consecutive electrode layers in the stack vary in size; and wherein the electrode layers in the stack form a non-rectangular terraced shape.

17. The portable electronic device of claim 16, wherein the flush-side of the stack includes conductive tabs that extend from the electrode layers in the stack.

18. The portable electronic device of claim 16, wherein each battery cell in the set of battery cells further comprises:
- a flexible pouch enclosing the stack of non-rectangular layers;
- a first conductive tab coupled to the cathode layers in the stack;
- a second conductive tab coupled to the anode layers in the stack; and
- wherein the first and second conductive tabs extend through seals in the flexible pouch to provide terminals for the battery cell.

* * * * *